US008984205B2

(12) United States Patent
Robillard et al.

(10) Patent No.: US 8,984,205 B2
(45) Date of Patent: Mar. 17, 2015

(54) DATA FILTER

(75) Inventors: David C. Robillard, Tucson, AZ (US);
Joseph D. Wagovich, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 475 days.

(21) Appl. No.: 13/426,702

(22) Filed: Mar. 22, 2012

(65) Prior Publication Data

US 2013/0254442 A1    Sep. 26, 2013

(51) Int. Cl.
*G06F 13/36* (2006.01)
*G06F 21/85* (2013.01)
*G06F 11/30* (2006.01)

(52) U.S. Cl.
CPC ..................................... *G06F 21/85* (2013.01)
USPC ........... 710/316; 710/314; 713/169; 713/189; 713/190; 726/26

(58) Field of Classification Search
CPC ..... G06F 21/71; G06F 21/74; G06F 12/1441; G06F 12/1491
USPC .................. 710/314, 316; 713/169, 189, 190; 726/26
See application file for complete search history.

(56) References Cited

U.S. PATENT DOCUMENTS

| 7,305,534 | B2 * | 12/2007 | Watt et al. | 711/163 |
| 7,765,356 | B2 * | 7/2010 | Weber | 710/314 |
| 7,930,360 | B2 * | 4/2011 | Sibert | 709/216 |
| 7,948,402 | B2 * | 5/2011 | Lewis et al. | 340/947 |
| 8,001,390 | B2 * | 8/2011 | Hatakeyama | 713/190 |
| 8,032,685 | B2 * | 10/2011 | Weber | 710/314 |
| 8,223,905 | B2 * | 7/2012 | Glass | 375/349 |
| 8,332,653 | B2 * | 12/2012 | Buer | 713/189 |
| 8,448,251 | B2 * | 5/2013 | Harris et al. | 726/26 |
| 8,762,720 | B2 * | 6/2014 | Charrat et al. | 713/169 |
| 2005/0086508 | A1 * | 4/2005 | Moran et al. | 713/200 |
| 2013/0246268 | A1 * | 9/2013 | Moshfeghi | 705/44 |
| 2013/0290637 | A1 * | 10/2013 | Turean et al. | 711/122 |

* cited by examiner

*Primary Examiner* — Brian Misiura
(74) *Attorney, Agent, or Firm* — Schwegman Lundberg & Woessner, P.A.

(57) ABSTRACT

A system includes an interface with a plurality of sub-addresses. The interface receives critical data and non-critical data. The critical data are received only at more specific sub-addresses of the interface. The interface transfers the critical data received at the sub-addresses to a critical processor, such that the critical data avoids being received by or being processed by a non-critical processor. The interface transfers the non-critical data from the interface to the non-critical processor. The configuration of the interface is hard-coded such that the configuration of the interface is fixed at power up of the interface and is non-changeable by the non-critical processor. The interface includes an external platform interface that is external to the critical processor, the non-critical processor, and a local controller. The external platform interface includes a limited ability to store the critical and non-critical data.

20 Claims, 9 Drawing Sheets

DATA FILTER

TECHNICAL FIELD

The current disclosure relates to data filters, and in an embodiment, but not by way of limitation, a data filter that is resident on an external platform interface and that is configured to separate safety critical data and non-safety critical data such that a non-safety critical processor does not receive or process safety critical data.

BACKGROUND

In some data processing environments, such as in a military data processing environment, data can be identified as safety critical data and other data can be identified as non-safety critical data. Safety critical data, or simply just critical data, are data that are of critical importance to the proper functioning of a system, such as a weapons system. Non-critical data are data that are not safety critical. Safety critical data can only be received, processed, and stored by a processor and software that is certified to handle such safety critical data. Consequently, when safety critical data is transferred from a bus controller (such as a MIL-STD-1553 Bus Controller Interface) to a bus or other device (such as a MIL-STD-1553 bus), the local processor reads data from the Remote Terminal Interface and transfers the critical data using a bus controller to the safety critical subsystem. All software that interfaces with the bus controller and remote terminal must go through extensive testing for safety critical data handling to verify that only non-safety critical data is received by the local processor.

Filtering logic for such an integrated subsystem is typically done using an external computer and software, making it rather difficult to certify for a safety critical environment since there are so many possible methods of corruption and storage of safety critical data from these interfaces. The cost involved for certification with an external computer and software is not insubstantial. Furthermore, several critical failure modes exist in such a system due to environmental upsets from nuclear and space radiation to the systems' soft configurations that are stored in registers and memory, thereby causing unpredicted results and possible rejection of the system for safety critical applications.

DETAILED DESCRIPTION

Figure 1:
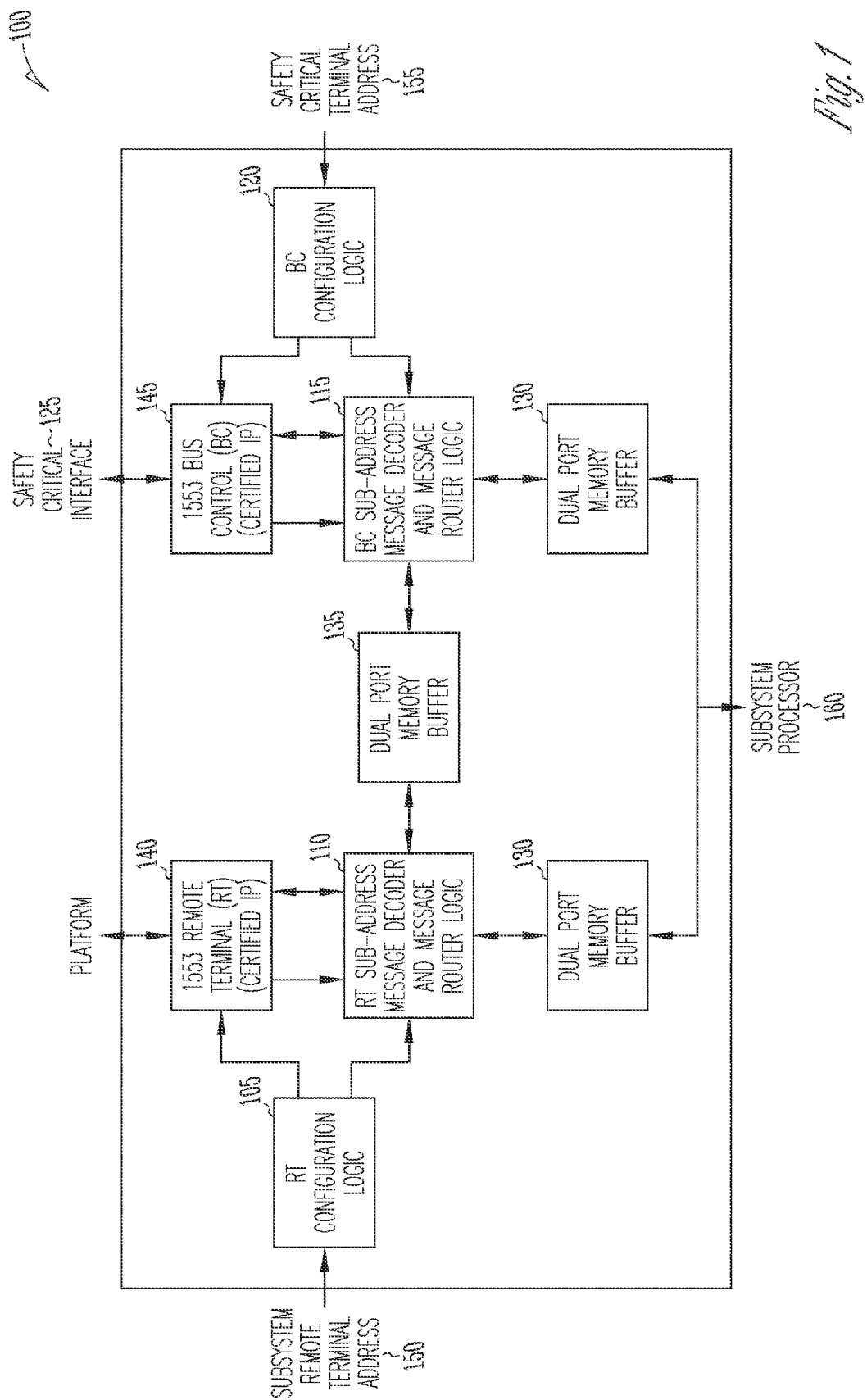
FIG. 1 is a block diagram of an example external interface for processing and filtering critical data and non-critical data.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

In an embodiment, smart filter logic in an external platform interface monitors designated sub-addresses in the platform interface and transfers designated safety critical messages directly to a safety critical interface without any external intervention from a local subsystem controller. Other messages that are not safety critical are transferred directly to the local subsystem controller. The external platform interface is external to a critical processor, a non-critical processor, and a local controller. As noted above, safety critical data, or simply just critical data, are data that are of critical importance to the proper functioning of a system, such as a weapons system. Non-critical data are data that are not safety critical. A safety critical processor handles the processing of the safety critical data, and a non-safety critical processor handles the processing of non-safety critical data. A non-safety critical processor is blocked from receiving any safety critical data and has no interface or communication with safety critical data.

An integrated remote terminal and bus controller with shared memory between them eliminates all software interaction for any transfer of safety critical data from the external platform interface to an isolated safety critical interface. The integrated subsystem also allows passing of non critical data from the external platform interface to the local subsystem controller. A second feature of the integrated transfer system is that it has no capability to store data that is sent to and that is received from the critical safety interface and external platform controller. This non-storage feature makes the integrated subsystem easier to certify for military and other environments that require special handling of safety critical data. A third feature is that configuration of safety critical data is fixed and not allowed to change due to environmental upsets or design modifications, since the target device is non-reprogrammable such that its configuration is not alterable in the environment.

The integrated subsystem interfaces with two readily available (commercial off the shelf (COTS)) logic modules and integrates a custom interface between these two readily available modules. This subsystem solves the above-identified issues relating to the handling of safety critical data by forcing the configuration to be fixed in hardware and removing any subsystem computer interface to safety critical data.

In an embodiment, critical data is received from one MIL-STD-1553 remote terminal interface and then transferred to an isolated MIL-STD-1553 interface using a local bus controller. The above disclosed integrated subsystem filters and blocks the critical data from interacting with the local subsystem processor and automatically transmits the critical data to the critical subsystem processor. The integrated subsystem transfers the data only as defined by designated sub-addresses on the external platform interface to the isolated MIL-STD-1553 bus automatically without any software interaction. Data not designated to be transferred to the isolated critical subsystem is buffered to the local subsystem processor. All designated configurations for the transfer of data to the critical interface remains fixed and are not allowed to be altered by the local subsystem processor. This implementation reduces the certification requirements of the local subsystem. Previous implementations of this type of data transfer allowed the local subsystem processor to configure both the remote terminal and the bus controller, and then transfer the data from one subsystem (local) to the other subsystem (critical) after it was received from the remote terminal.

The blocking of any local subsystem processor interaction on critical data can be important. Safety certification requires a high level of testing on the software of the local subsystem processor that interfaces with the bus controller and remote terminal modules, since any software module could interact, change, or corrupt the data. This could occur for both normal operation or in a failed condition where upsets occurred in the bus controller or remote terminal's configuration due to soft upsets. The certification process is quite involved since interaction with software driver modules from other software modules might corrupt this critical data or modify the configuration of the serial interface controllers. Also, failure modes of all soft upsets must be evaluated due to environmental upsets which could change the configuration of the bus controller or remote terminal serial interface modules after they were configured, resulting in unknown operation.

The integrated subsystem external platform interface prevents the local subsystem processor from receiving or processing critical data that is being transferred to the critical processor. The integrated subsystem transfers this data to a bus for transfer to the safety critical processor automatically. Only data designated to the safety critical bus is transferred to the isolated safety critical processor. Other non-safety critical data that is targeted for the local subsystem is directly transferred to the local subsystem processor.

Another feature or certification ensures that no critical data that is transferred to the safety critical subsystem is stored for more than one message. That is, there is a limited ability to store such critical data. The certification effort for this approach is reduced since the configuration minimizes the amount of logic that is involved in the transfer. Furthermore, the configuration is fixed, so that no upsets occur in the configuration. The logic that has to be certified in the external platform interface is remote terminal fixed configuration logic, bus controller fixed configuration logic, remote terminal sub-address message decoder, remote terminal message router logic, bus controller sub-address message decoder, and the bus controller message router logic. This logic can be implemented in an ASIC or non-reconfigurable FPGA, thereby eliminating configuration upsets also not allowed by the subsystem processor to change the configuration of any message associated with the sub-addresses for the critical parameter transfers. The configuration of the certified remote terminal and the certified bus controller is hard coded in a fixed logic device (ASIC or one-time programmable antifuse-based FPGA).

FIG. 1 is a block diagram of an example external interface 100 for processing and filtering critical data and non-critical data. The custom logic for the filter is contained in the remote terminal configuration logic 105, the remote terminal sub-address message decoder and message logic router 110, the bus controller sub-address message decoder and message router logic 115, and the bus controller configuration logic 120. The configuration of both the remote terminal and bus controller is hard coded inside elements 105, 110, 115, and 120, such that all internal configuration registers of these elements are fixed at power up. Messages on selected sub-addresses that are to be transferred to the safety critical interface 125 are routed through a memory buffer 130 directly to and from the memory buffer 135 between the two controllers 140, 145. All other non-safety critical messages to and from each of the controllers 140, 145 are routed to and from buffers 130 to the subsystem processor. The sub-address decoder and router 110, 115 connected to the remote terminal 150 and the bus controller 155 move data from the respective buffers (135, 130) to the appropriate controller (125, 160).

Figure 2:
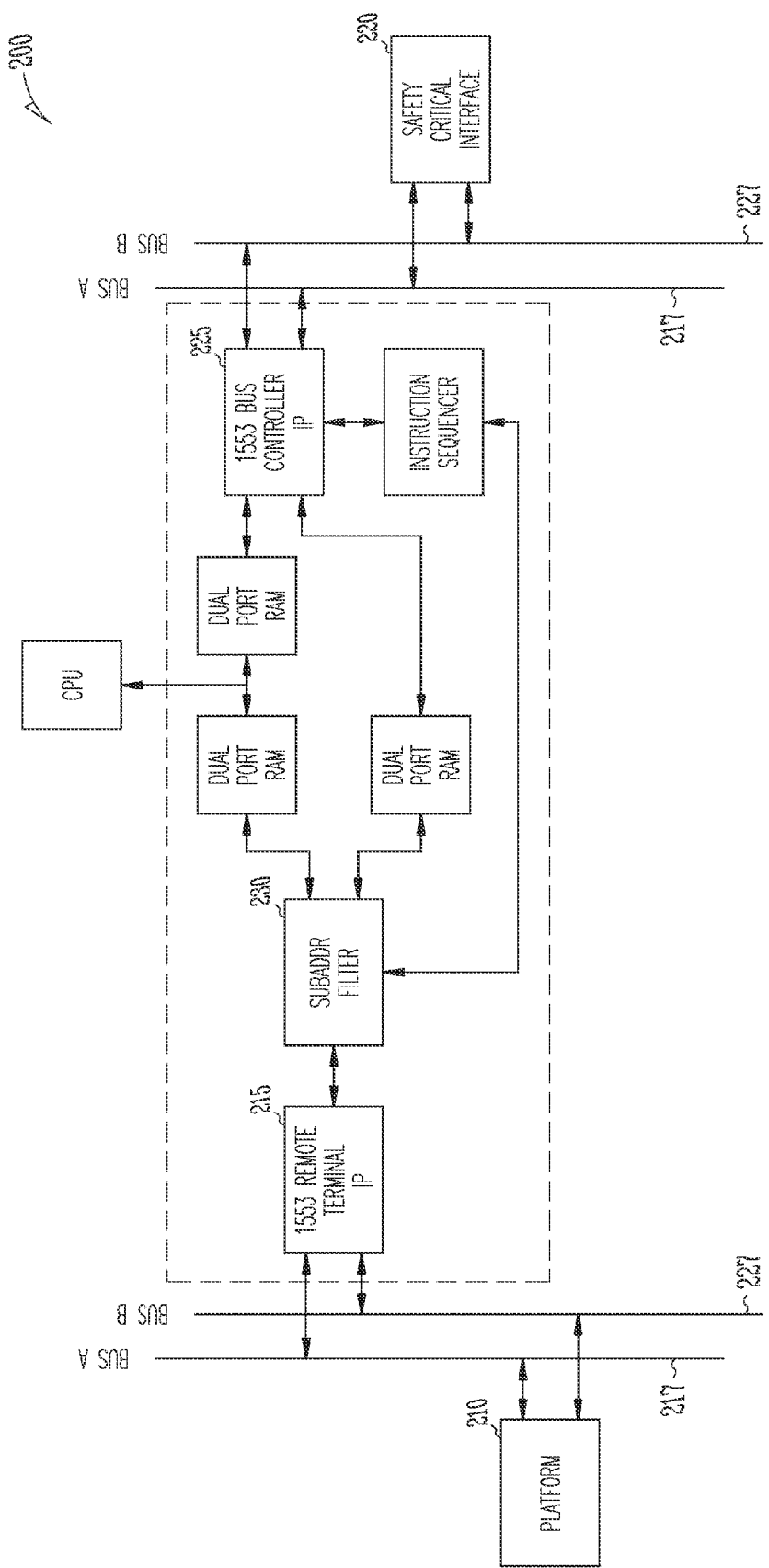
FIG. 2 is a block diagram of another example external interface for processing and filtering critical and non-critical data.

FIG. 2 is a block diagram of another example external interface 200 for processing critical and non-critical data. Specifically, FIG. 2 illustrates an implementation on an Actel AX2000 device. Both the platform interface 210 and the safety critical interface 220 are connected to their dedicated dual redundant transceiver 215 or external transformer 225 via dual buses 217, 227 respectively. The buses 217, 227 are different buses. The subsystem processor interface 230 is allowed to interface with both the bus controller 225 and the remote terminal 215 only for allowed sub-addresses. The selection of these sub-address assignments is fixed by the configuration of the ASIC or non-reconfigurable FPGA.

Figure 3:
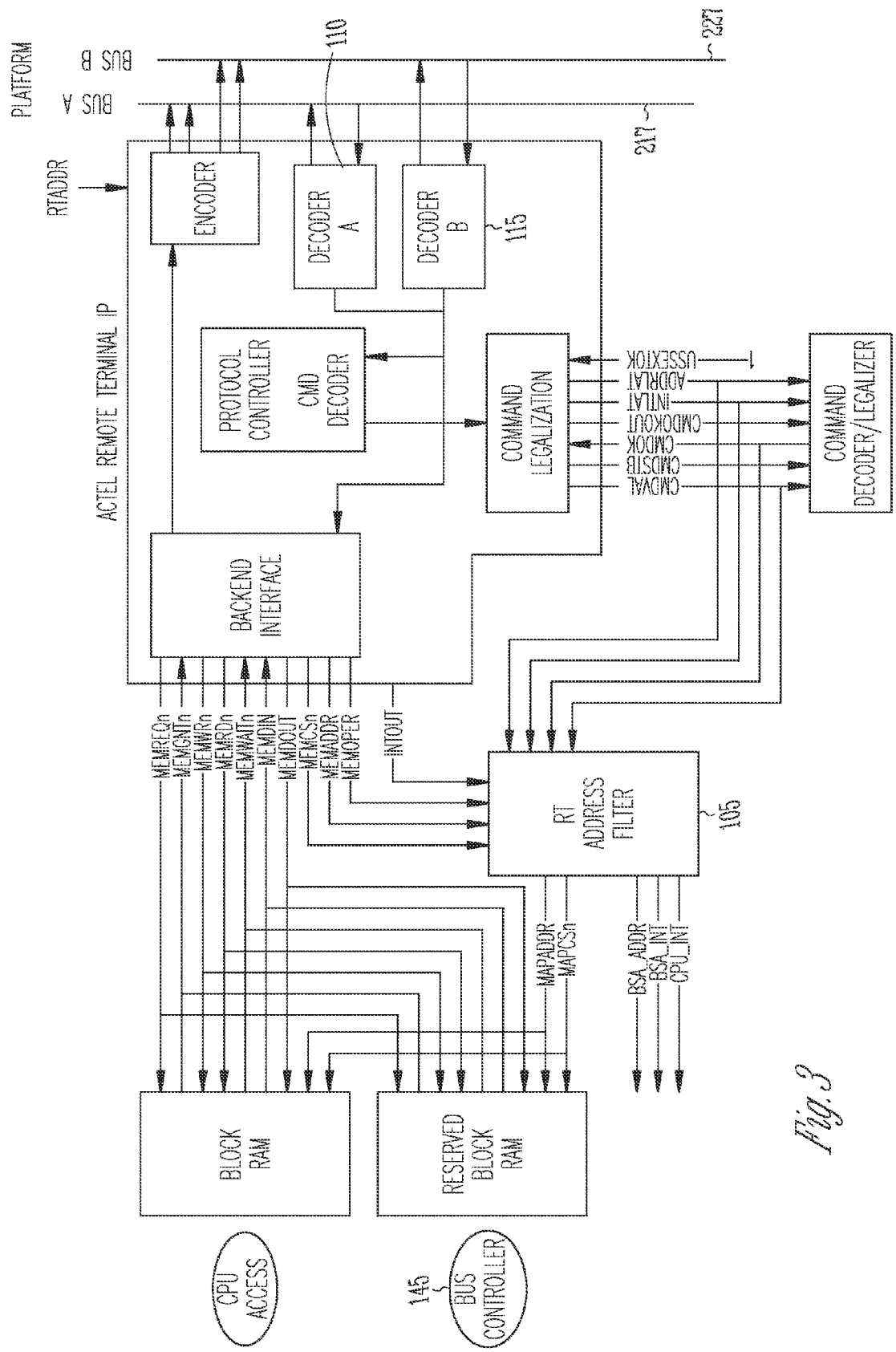
FIG. 3 is a block diagram of another example external interface for processing and filtering critical and non-critical data.

FIG. 3 is a detailed block diagram of an implementation of a custom smart filter logic device. This particular implementation uses an Actel AntiFuse FPGA AX2000 device to implement the bus controller 145, remote terminal 105, and the custom smart filter logic 110, 115. However, the logic could be implemented in other FPGAs or in a custom ASIC.

Figure 4:
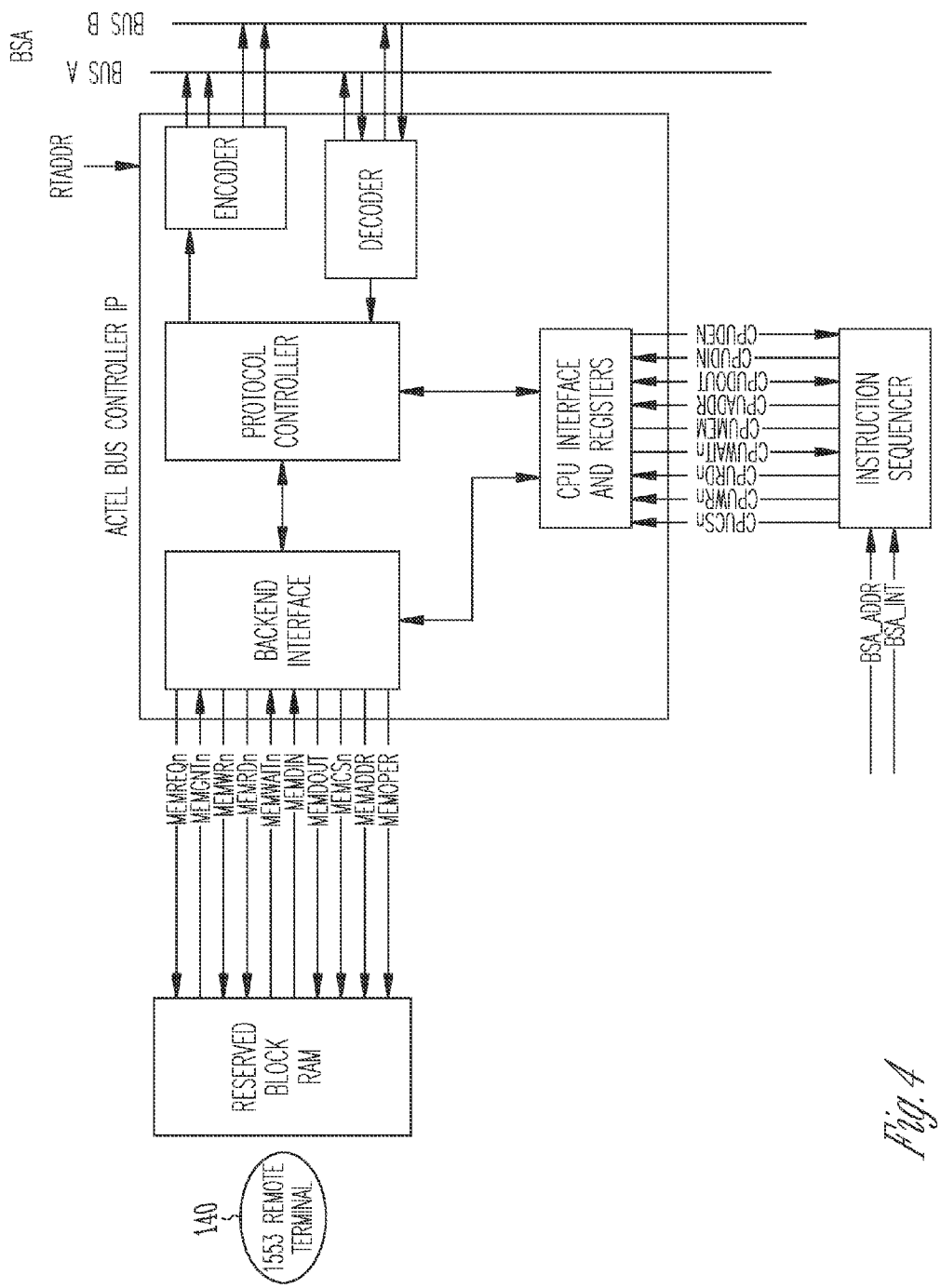
FIG. 4 is a block diagram of an example bus controller.

A detailed block diagram of the implementation of the details of the interfacing of the remote terminal IP 140 is shown in FIG. 4. This specific implementation uses an Actel remote terminal core for the remote terminal function. It should be noted that other bus controllers and remote terminal configurations could be used for the bus controller and remote terminal interfaces.

Figure 5:
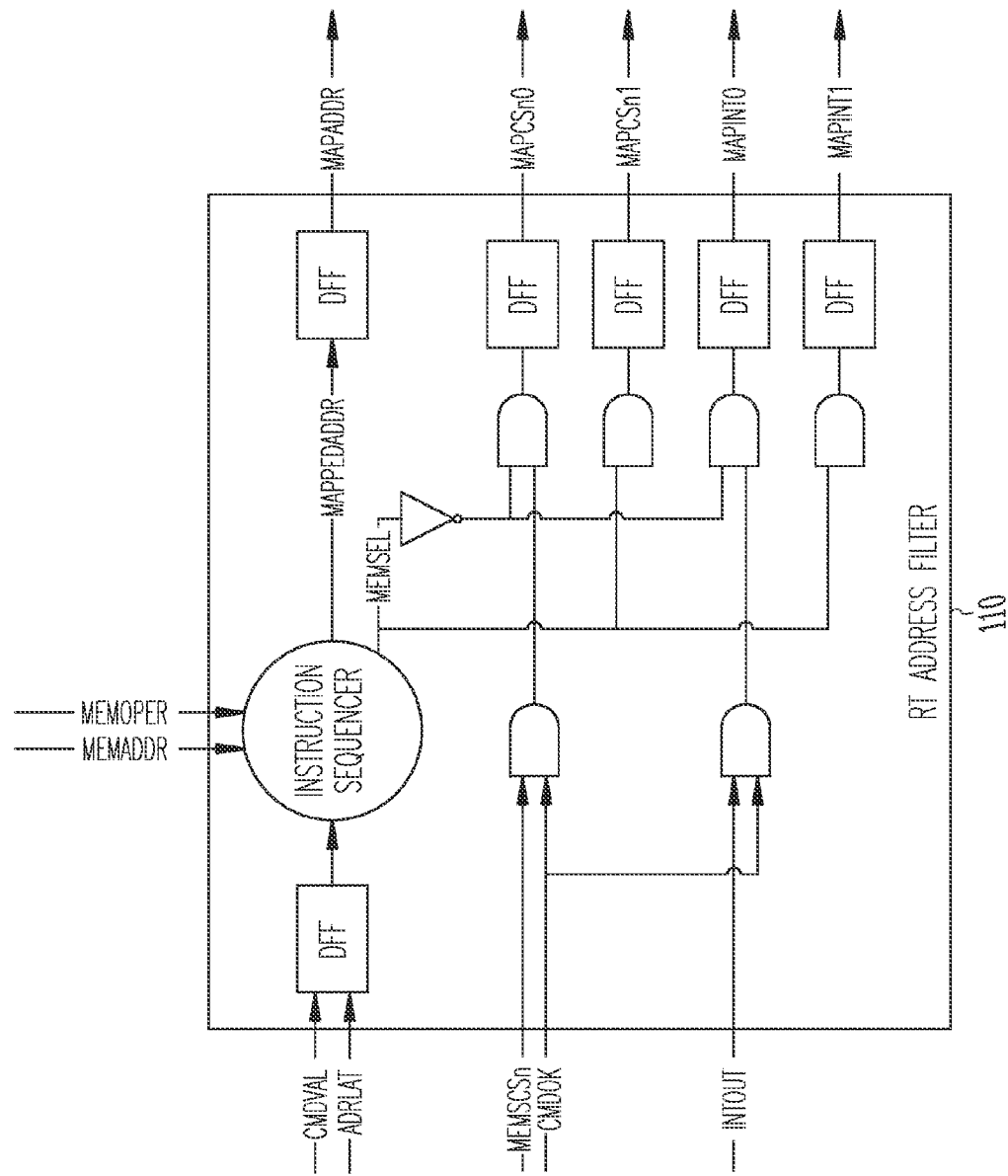
FIG. 5 is a block diagram of an example address decoder.

FIG. 5 is a block diagram of an example address decoder 110. Specifically, the remote terminal sub address message decoder and message router logic controls which of the two dual port buffer memories 130, 135 that received data or transmitted data will be used by the remote terminal. This logic is mostly contained within the remote terminal IP itself and the mapping to the shared bus controller and remote terminal memory or the shared remote terminal and system processor memory is controlled by using different address spaces for each of the sub address assignments. This mechanism will cause the remote terminal to only read or write data to the shared bus controller/remote terminal memory if defined as safety critical data. Similarly, if the sub address identifies the incoming command word as not safety critical, the transmitted or received data are stored in the shared memory 135 between the remote terminal and subsystem controller. The controls to the memory use the sub-address command word output to provide the memory chip select signal selection.

Figure 6:
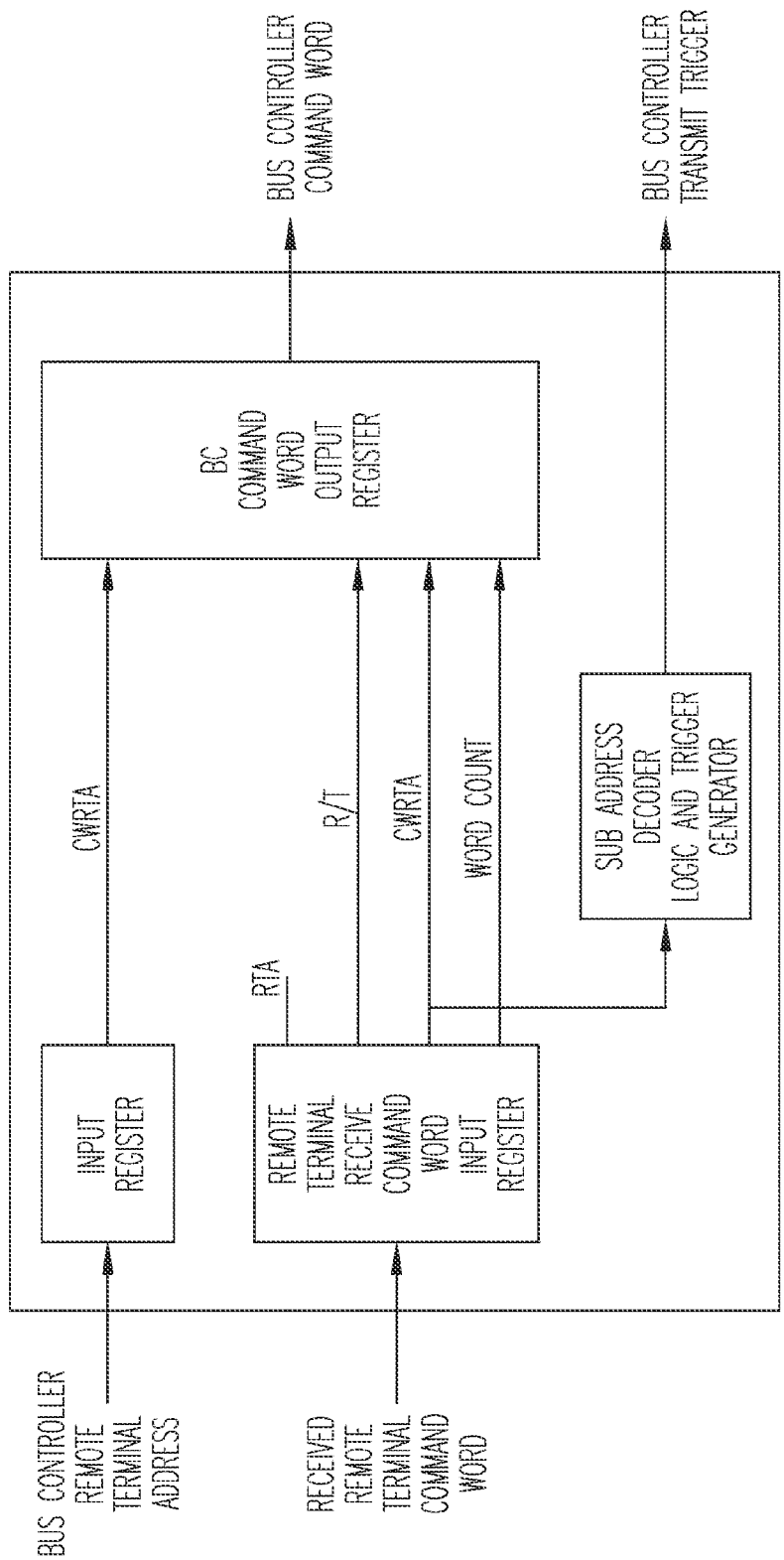
FIG. 6 is a block diagram of an example bus controller transmit trigger.

FIG. 6 is a block diagram of an example bus controller transmit trigger. In the case where the data are safety critical and data are received from a received data command from the platform interface, the decode of the command word will provide a trigger to the bus controller so that the safety critical data can be immediately commanded to the safety critical subsystem at the remote terminal as defined by the external strapping and sub address and word count of the incoming message. This remote terminal received command word is loaded into the bus controller, with the terminal address replaced by the external strap for the bus controller remote terminal address. The trigger will initiate the start of the message transfer for the bus controller. The bus controller will get the data just deposited in the shared dual port memory between the bus controller and remote terminal. This command latch and trigger select detection logic will result in about a 22 microsecond delay for the transmission of data by the bus controller from the start of receiving the received command word.

Figure 7A:
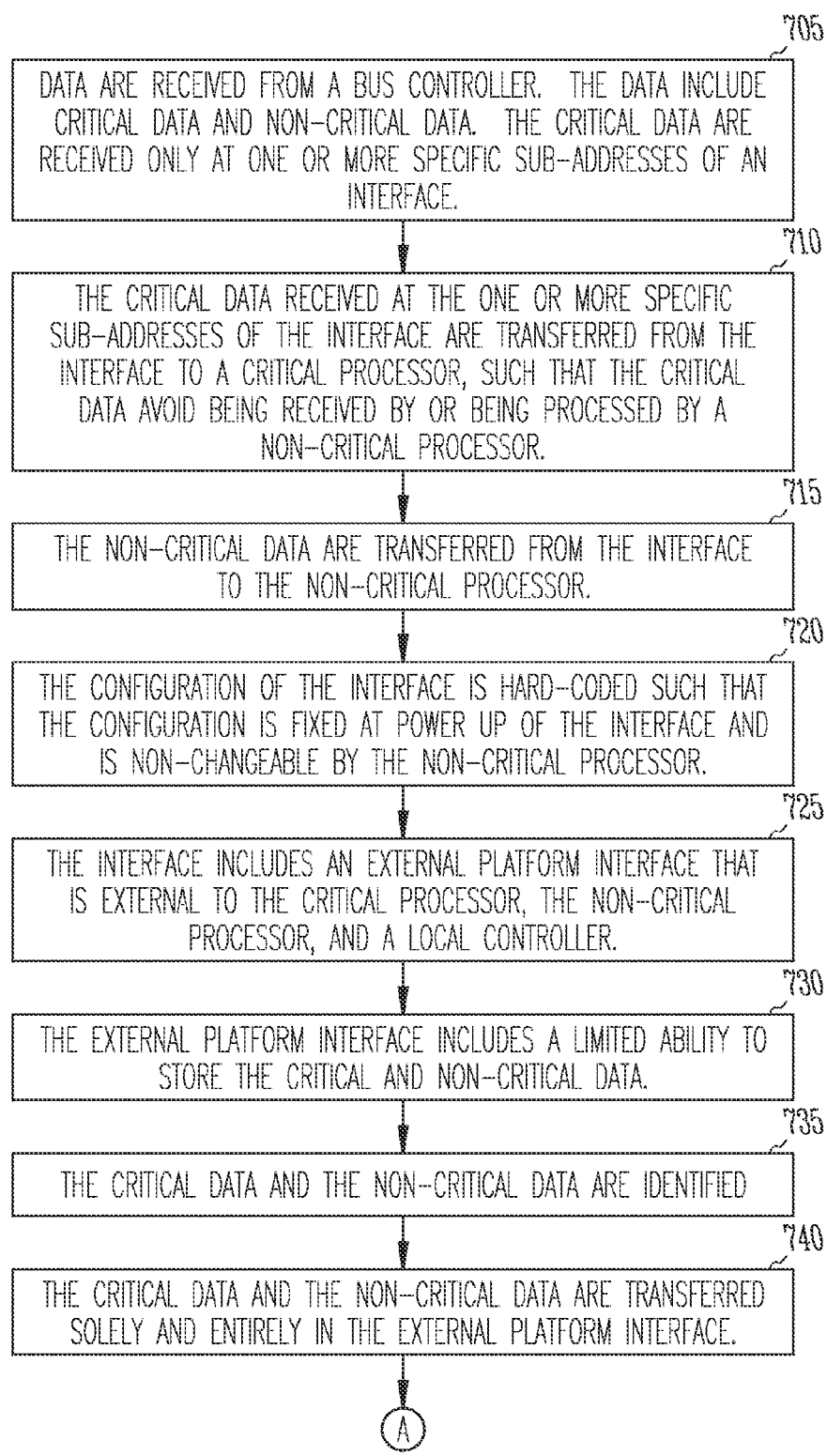
FIGS. 7A and 7B are a block diagram of an example process of filtering critical and non-critical data.
Figure 7B:
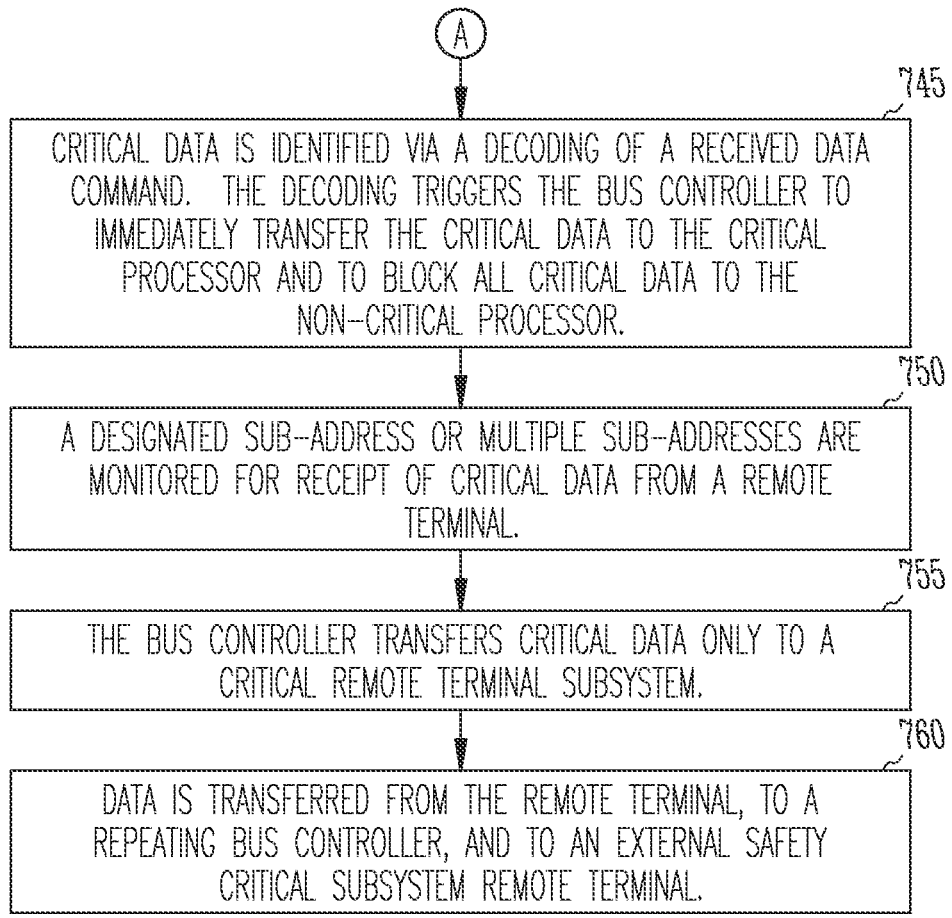

FIGS. 7A and 7B are a block or flowchart-like diagram of an example process 700 for filtering critical and non-critical data. FIGS. 7A and 7B include a number of process and feature blocks 705-760. Though arranged serially in the example of FIGS. 7A and 7B, other examples may reorder the blocks, omit one or more blocks, and/or execute two or more blocks in parallel using multiple processors or a single processor organized as two or more virtual machines or subprocessors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring to FIGS. 7A and 7B, at 705, data are received from a bus controller. The data include critical data and non-critical data. The critical data are received only at one or more specific sub-addresses of an interface. At 710, the critical data received at the one or more specific sub-addresses of the interface are transferred from the interface to a critical processor, such that the critical data avoid being received by or being processed by a non-critical processor. At 715, the non-critical data are transferred from the interface to the non-critical processor. At 720, the configuration of the interface is hard-coded such that the configuration is fixed at power up of the interface and is non-changeable by the non-critical processor. At 725, the interface includes an external platform interface that is external to the critical processor, the non-critical processor, and a local controller. At 730, the external platform interface includes a limited ability to store the critical and non-critical data.

At 735, the critical data and the non-critical data are identified, and at 740, the critical data and the non-critical data are transferred solely and entirely in the external platform interface. At 745, critical data is identified via a decoding of a received data command. The decoding triggers the bus controller to immediately transfer the critical data to the critical processor and to block all critical data to the non-critical processor. At 750, a designated sub-address or multiple sub-addresses are monitored for receipt of critical data from a remote terminal. At 755, the bus controller transfers critical data only to a critical remote terminal subsystem. At 760, data is transferred from the remote terminal, to a repeating bus controller, and to an external safety critical subsystem remote terminal.

Figure 8:
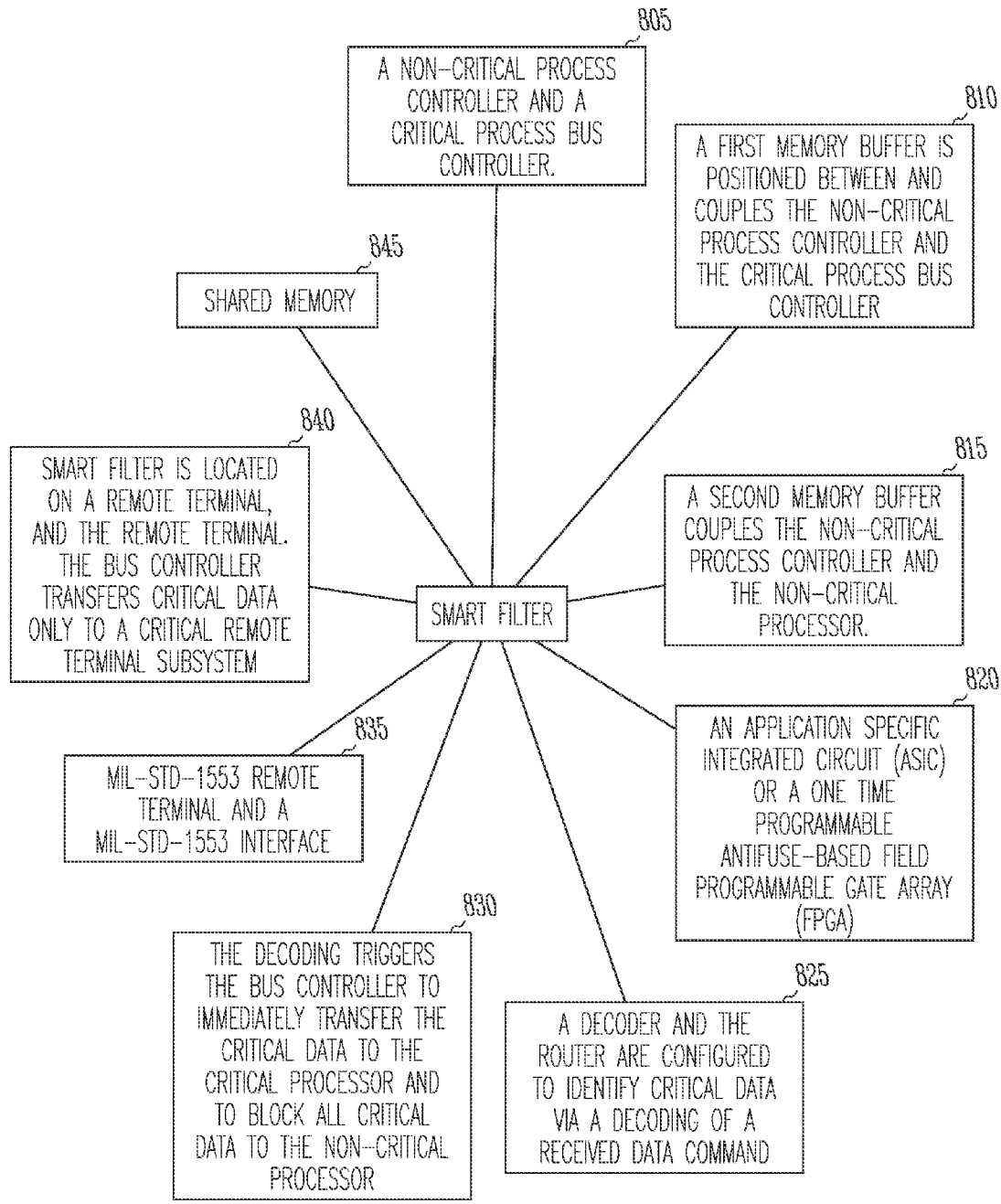
FIG. 8 is a block diagram of features of a system and process of filtering critical and non-critical data.

FIG. 8 is a block diagram of features of a smart filter system for filtering critical and non-critical data. As illustrated at 805, the processors in such a smart filter system can include a non-critical process controller and a critical process bus controller. At 810, a first memory buffer is positioned between and couples the non-critical process controller and the critical process bus controller, and at 815, a second memory buffer couples the non-critical process controller and the non-critical processor.

The smart filter can include an application specific integrated circuit (ASIC) or a one time programmable antifuse-based field programmable gate array (FPGA) to interface with an external bus controller, which transmits both critical and non-critical data (820). The smart filter can further include a decoder and a router. The decoder and the router are configured to identify critical data via a decoding of a received data command (825). The decoding triggers the bus controller to immediately transfer the critical data to the critical processor and to block all critical data to the non-critical processor (830).

The remote terminal can be a MIL-STD-1553 remote terminal and the critical processor can be a MIL-STD-1553 interface (835). The external platform interface is configured to monitor a designated sub-address or multiple sub-addresses for receipt of critical data from a remote terminal. The smart filter can be located on a remote terminal, and the remote terminal can be configured to use the bus controller to transfer critical data only to a critical remote terminal subsystem (840). The smart filter can include a shared memory (845). The shared memory cannot be accessed by a local processor.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate example embodiment.

The invention claimed is:

1. A system comprising:
   one or more computer processors, resident in an interface with a plurality of sub-addresses, the one or more computer processors configured to:
   receive data from a bus controller, the data comprising critical data and non-critical data, wherein the critical data are received only at one or more specific sub-addresses of the interface;
   transfer the critical data received at the one or more specific sub-addresses of the interface from the interface to a critical processor, such that the critical data avoid being received by or being processed by a non-critical processor; and
   transfer the non-critical data from the interface to the non-critical processor;
   wherein the configurations of the one or more computer processors in the interface are hard-coded such that the configurations of the one or more computer processors are fixed at power up of the computer processors and are non-changeable by the non-critical processor;
   wherein the one or more computer processors in the interface comprise an external platform interface that is external to the critical processor, the non-critical processor, and a local controller; and
   wherein the external platform interface comprises a limited ability to store the critical and non-critical data.

2. The system of claim 1, wherein the one or more computer processors comprise a non-critical process controller and a critical process bus controller, and comprising a first memory buffer positioned between and coupling the non-critical process controller and the critical process bus controller; and a second memory buffer coupling the non-critical process controller and the non-critical processor.

3. The system of claim 1, wherein the one or more computer processors comprise one or more of an application specific integrated circuit (ASIC) or a one time programmable anti fuse field programmable gate array (FPGA) to interface with an external bus controller, which transmits both critical and non-critical data.

4. The system of claim 1, wherein identification of the critical data and the non-critical data and the transfer of the critical data and the non-critical data are executed solely and entirely in the external platform interface.

5. The system of claim 1, wherein the one or more computer processors comprise a decoder and a router, and wherein the decoder and the router are configured to identify critical data via a decoding of a received data command, and the decoding triggers the bus controller to immediately transfer the critical data to the critical processor and to block all critical data to the non-critical processor.

6. The system of claim 1, wherein a remote terminal comprises a MIL-STD-1553 remote terminal and the critical processor comprises an MIL-STD-1553 interface.

7. The system of claim 1, wherein the external platform interface is configured to monitor a designated sub-address or multiple sub-addresses for receipt of critical data from a remote terminal.

8. The system of claim 1, wherein the one or more computer processors are located on a remote terminal, and the remote terminal is configured to use the bus controller to transfer critical data only to a critical remote terminal subsystem.

9. The system of claim 8, comprising a shared memory, wherein the shared memory cannot be accessed by a local processor; and wherein data is transferred from the remote terminal, to a repeating bus controller, and to an external safety critical subsystem remote terminal.

10. A process comprising:
  receiving data from a bus controller, the data comprising critical data and non-critical data, wherein the critical data are received only at one or more specific sub-addresses of an interface;
  transferring the critical data received at the one or more specific sub-addresses of the interface from the interface to a critical processor, such that the critical data avoid being received by or being processed by a non-critical processor; and
  transferring the non-critical data from the interface to the non-critical processor;
  wherein the configuration of the interface is hard-coded such that the configuration is fixed at power up of the interface and is non-changeable by the non-critical processor;
  wherein the interface comprises an external platform interface that is external to the critical processor, the non-critical processor, and a local controller; and
  wherein the external platform interface comprises a limited ability to store the critical and non-critical data.

11. The process of claim 10, comprising identifying the critical data and the non-critical data and transferring the critical data and the non-critical data solely and entirely in the external platform interface.

12. The process of claim 10, comprising identifying critical data via a decoding of a received data command, wherein the decoding triggers the bus controller to immediately transfer the critical data to the critical processor and to block all critical data to the non-critical processor.

13. The process of claim 10, comprising monitoring a designated sub-address or multiple sub-addresses for receipt of critical data from a remote terminal.

14. The method of claim 10, comprising using the bus controller to transfer critical data only to a critical remote terminal subsystem.

15. The method of claim 14, comprising transferring data from the remote terminal, to a repeating bus controller, and to an external safety critical subsystem remote terminal.

16. A tangible computer readable storage device comprising instructions that when executed by a processor execute a process comprising:
  receiving data from a bus controller, the data comprising critical data and non-critical data, wherein the critical data are received only at one or more specific sub-addresses of an interface;
  transferring the critical data received at the one or more specific sub-addresses of the interface from the interface to a critical processor, such that the critical data avoid being received by or being processed by a non-critical processor; and
  transferring the non-critical data from the interface to the non-critical processor;
  wherein the configuration of the interface is hard-coded such that the configuration is fixed at power up of the interface and is non-changeable by the non-critical processor;
  wherein the interface comprises an external platform interface that is external to the critical processor, the non-critical processor, and a local controller; and
  wherein the external platform interface comprises a limited ability to store the critical and non-critical data.

17. The tangible computer readable storage device of claim 16, comprising instructions for identifying the critical data and the non-critical data and transferring the critical data and the non-critical data solely and entirely in the external platform interface.

18. The tangible computer readable storage device of claim 16, comprising instructions for identifying critical data via a decoding of a received data command, wherein the decoding triggers the bus controller to immediately transfer the critical data to the critical processor and to block all critical data to the non-critical processor.

19. The tangible computer readable storage device of claim 16, comprising instructions for monitoring a designated sub-address or multiple sub-addresses for receipt of critical data from a remote terminal.

20. The computer readable storage device of claim 19, comprising instructions for using the bus controller to transfer critical data only to a critical remote terminal subsystem, and instructions for transferring data from the remote terminal, to a repeating bus controller, and to an external safety critical subsystem remote terminal.

* * * * *